United States Patent [19]
Kreye et al.

[11] Patent Number: 5,516,184
[45] Date of Patent: May 14, 1996

[54] MOTOR-VEHICLE WINDOW PIVOT

[75] Inventors: Bernhard Kreye, Wunstorf; Gottfried Mittelstädt, München, both of Germany

[73] Assignee: Henninges Elastomer-und Kunststofftechnik, GmbH & Co., Rehburg Loccum, Germany

[21] Appl. No.: 231,943

[22] Filed: Apr. 21, 1994

[51] Int. Cl.⁶ ............................................... B60J 1/14
[52] U.S. Cl. ...................................... 296/146.16; 49/388
[58] Field of Search ........................... 296/96.11, 146.16; 49/388, 391

[56] References Cited

U.S. PATENT DOCUMENTS 4,396,221  8/1983  Morgan et al. ...................... 296/96.11

FOREIGN PATENT DOCUMENTS

| | | |
|---|---|---|
| 96129 | 12/1983 | European Pat. Off. . |
| 3425687 | 1/1986 | Germany . |
| 87-09446 | 8/1987 | Germany . |
| 3605750 | 8/1987 | Germany . |
| 3925804 | 8/1990 | Germany . |
| 62-18315 | 1/1987 | Japan . |
| 62-103220 | 5/1987 | Japan . |
| 920434 | 3/1963 | United Kingdom . |

*Primary Examiner*—Andrew C. Pike
*Attorney, Agent, or Firm*—Longacre & White

[57] ABSTRACT

The present disclosure concerns a pivotable motor-vehicle body-window of which the pane or window is pivotable about an essentially vertical pivot axis located at the leading edge of the pane. Clamps mounted on the pane periphery grip both sides of the pane by means of an adhesive. Flexible bent segments are affixed to the clamps and are used to fasten the clamps to the body. A frame made of PVC or other materials such as elastomers is injection-molded around the clamp and the leading edge of the pane.

6 Claims, 3 Drawing Sheets

MOTOR-VEHICLE WINDOW PIVOT

BACKGROUND OF THE INVENTION a) Field of the Invention

The invention concerns a pivoting window for motor-vehicle bodies, the pane or window being pivotable about a substantially vertical pivot axis located at a leading edge of the pane and being lockable in either an open or closed position. In this disclosure, the open position occurs when the trailing edge of the pane is separated from the vehicle body, and the closed position occurs when the trailing edge of the pane is retained against the vehicle body.

b) Description of Related Art

Known motor-vehicle windows of this kind comprise a pane, which may be insulating glass, which is affixed without a frame by means of hinges to the body sheet metal. Disadvantages of this arrangement include the comparatively high cost of creating holes in the pane together with the labor required to attach the panes to the body with hinges.

SUMMARY OF THE INVENTION

It is an object of the present invention to design a vehicle window that can be assembled in a simple manner and at relatively low cost.

The present invention solves this problem with at least one metal clamp gripping a pane at its periphery. The metal clamp(s) comprise two legs affixed to the opposite surfaces of the pane by an adhesive deposited between the legs and the pane. A flexible bent segment extending from either leg of the clamp affixes the clamp to supporting sheet metal. This assembly is subsequently encased by injection-molding with PVC or another material, such as an elastomer or the like.

The pivot window according to the present design is able to pivot the required few degrees about the approximately vertical pivot axis as a consequence of the flexibility of the bent segment. The window can be pivoted about this pivot axis regardless of whether the flexible bent segment extends from the clamp leg affixed to the vehicle interior or on the vehicle exterior of the window pane.

Appropriately the flexible segment is bent substantially at a right angle forming the approximately vertical pivot axis about which the finished pivot window may be pivoted.

To manufacture the finished pivot window, first a polyurethane adhesive is deposited on the opposite faces of the pane at edge zone(s) of the pane, possibly after priming them if called for. Next, the clamp(s) together with the flexible bent segments are plugged onto the pane, and are bonded thereto by the adhesive. After which, this assembly is encased by injection-molding along the periphery of the pane to form a frame.

In an especially appropriate embodiment, each individual clamp is integrally formed with a flexible bent segment extending along the outside, relative to the pane, of a clamp leg. In this embodiment mode, additional connections between the flexible bent segment and the clamp are eliminated.

While it is feasible to provide the vehicle interior clamp leg with the flexible bent segment, it has been found to be especially advantageous for the flexible bent segment to extend from the vehicle exterior clamp leg because the pivot axis is moved outward and the leading edge portions of the frame are given more space for their motion. If the pivot axis is forced inward, the flexibility of the bent segment becomes less than if it were located outside.

The two clamp legs may also include orifices through which the frame material being injection-molded engages the pane, whereby the pane is reliably secured inside the frame.

Where the flexible bent segment and one of the clamp legs overlie one another in the vicinity of the frame, boreholes or orifices in the two components can be manufactured simultaneously in one operation.

As already described above, the flexible bent segment comprises at least two mutually orthogonal portions, the portion attached to the vehicle extends outside the injection-molded frame and detachably connects to the supporting sheet metal with screw fasteners or the like.

As regards vehicle bodies in which the supporting sheet metal is a vertical post of comparatively large cross section in the vicinity of the pivot window, the frame of the pivot window is affixed to one side of said post. Because the cross-sectional space occupied by this post leaves little room for the injection-molded frame, this entails changing the design of the fastening screw and the frame.

The fastening screw to be installed is positioned 90° in a horizontal plane relative to the above stated embodiments and its head must be fairly flat to be able to enter what space in the frame remains.

Further, changes in the flexible bent segment are required. The flexible bent segment cannot be of the length stated in the previous embodiments, and must be shaped in such a manner that bending by corresponding material deformation will still provide the necessary flexibility when opening the window.

To solve this problem, the flexible segment is bent three times: a first portion is bent at a right angle in a counter-clockwise manner adjacent the clamp, a second portion is bent at a right angle in a clockwise manner, and a third portion is bent at a right angle in clockwise manner again so as to be parallel to the portion is adjacent to the clamp.

This design makes it possible on one hand to mount the flat screwhead in the zone between the first and third portions and on the other hand to secure residual room to accommodate the frame injection-molding material, even if of a lesser volume.

The invention is further elucidated below with respect to the embodiments shown in the drawings.

DESCRIPTION OF THE PREFERRED EMBODIMENTS

Figure 1:
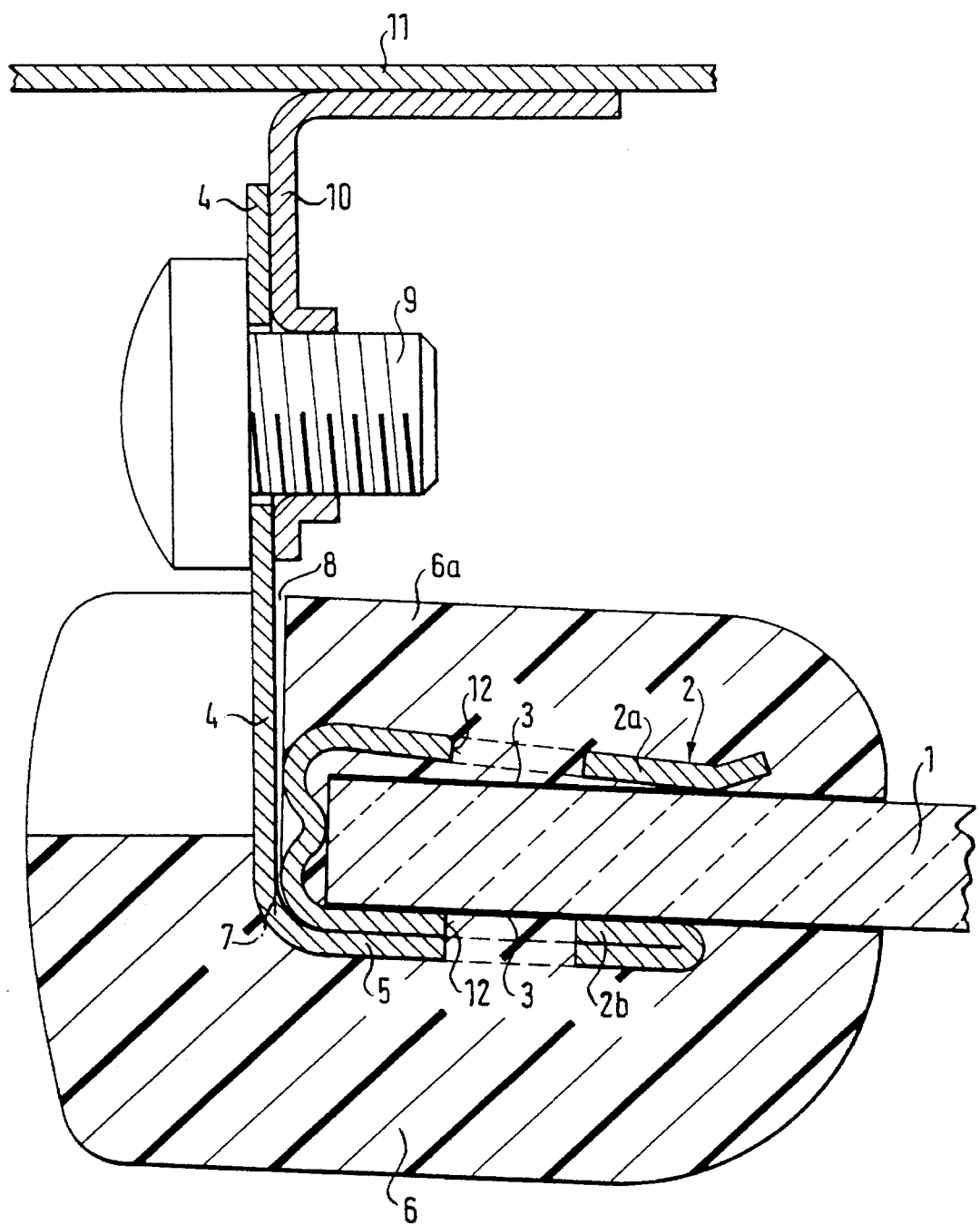
FIG. 1 is a cross section of a first embodiment of the present invention in the vicinity of the vertical pivot axis with the pivot window shown open.

As shown in FIG. 1, the pane 1 of a pivot window is held in place by one or more clamps 2 of which the legs 2a and 2b grip the pane from both sides. A PVC or elastomer adhesive 3 or the like may be deposited between the legs 2a and 2b and the pane 1.

As further shown by FIG. 1, each clamp 2 is affixed to a flexible bent segment 4, itself affixable to a vehicle body. The flexible segment 4 is made of sheet metal and comprises a bent portion 5 in the vicinity of the pane 1 extending along the outside of either leg 2a, 2b of the clamp 2.

The assembly consisting of the bent portion 5 and the clamp 2 is encased in a frame 6 which may consist of PVC or other materials such as elastomers or the like. The frame 6 is injection-molded onto the pane 1.

The pivot window requires pivoting by only a few degrees from the projection of the flexible bent segment 4 engaging the frame 6 and this pivoting in particular taking place where the bent portion 5 adjoins the approximately orthogonal remaining portion of the flexible bent segment 4. An approximately vertical pivot axis 7 and the mutual mobility of the components indicated in FIG. 1 may be implemented by deforming the flexible bent segment 4 in the vicinity of the pivot axis 7.

As further shown by FIG. 1, the length of the bent portion 5 is about the same as that of the legs of the clamp 2 which, as also shown in FIG. 1, may be integral with the bent portion 5 present along the outside of the clamp leg 2b.

In the top view of FIG. 1, the pivot window is open and this feature is indicated by the gap 8 between the frame part 6a and the flexible bent segment 4.

The supporting sheet metal 4 also may be connected by a screw 9 to a retaining bracket 10 which is in turn connected, by bonding, welding, or the like, to the supporting sheet metal of a vehicle body 11.

Figure 2:
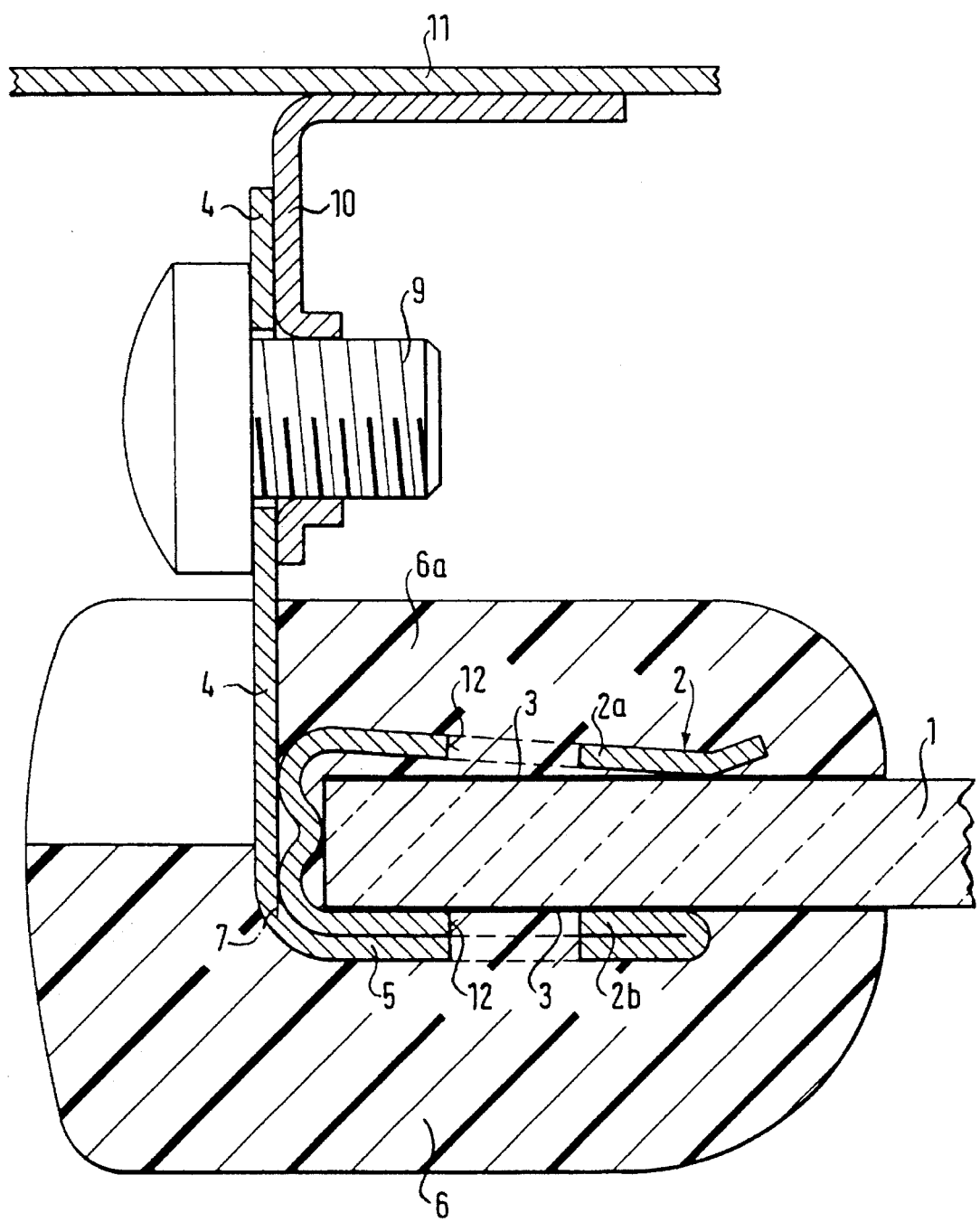
FIG. 2 is a cross section similar to that of FIG. 1 with the pivot window shown closed.

FIG. 2 is the same top view as FIG. 1 but for the window being closed as indicated by the frame segment 6a resting against the flexible bent segment 4. The two portions of the flexible bent segment 4 therefore are mutually bent about the approximately vertical pivot axis 7 in FIGS. 1 and 2. In this angular range the flexible bent segment 4 is correspondingly deformed.

As further shown by FIGS. 1 and 2, the legs 2a and 2b, as well as the bent portion 5 of the flexible bent segment 4, may comprise orifices 12 which can be manufactured in one operation when two of these parts overlie one another (in this case the vehicle exterior leg 2b and the bent portion 5). As shown in FIGS. 1 and 2, the frame 6 extends through the orifices 12, as well through the orifice formed in the bent portion 5, to thereby contact the pane 1.

Figure 3:
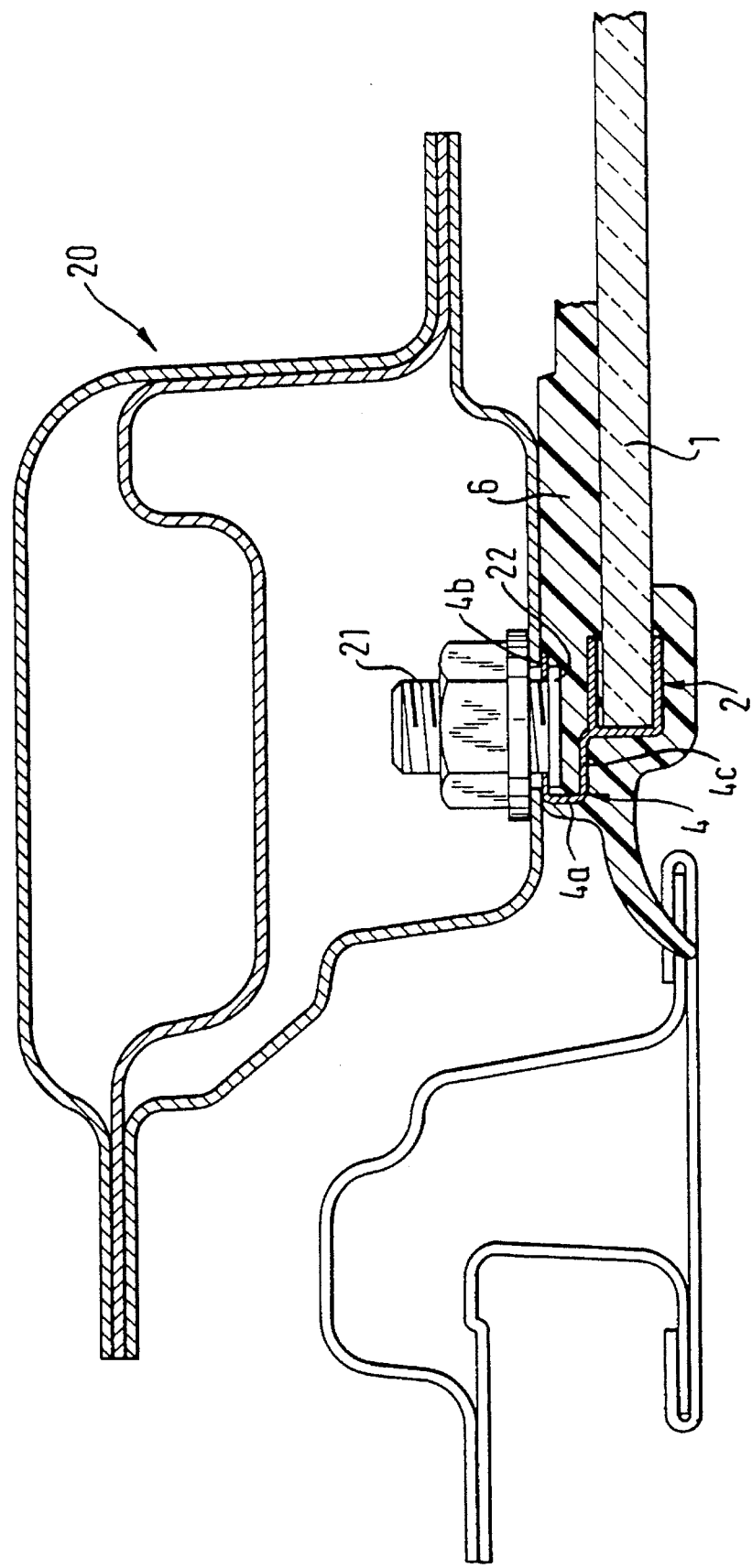
FIG. 3 is a cross section of a second embodiment of the present invention.

FIG. 3 shows a special design with a vertical body post 20 evincing a comparatively large cross section to offer the appropriate strength, and to which shall be mounted on one side the pivot window 1. Because of the considerable cross section of the vertical post 20, little room is left for the injection-molded frame 6 and therefore fastening in the manner shown in FIGS. 1 and 2 is precluded. Instead, a fastening screw 21 is installed at a 90° angle to that of the embodiment shown in FIGS. 1 and 2, and it must comprise a relatively flat head 22 to fit into the remaining space.

For the same reason, the bent portion 5 of the flexible bent segment 4 of the clamp 2 cannot be as long as that shown in the previous embodiment. Nevertheless, it must still offer a geometry allowing bending by corresponding material deformation when the window is being opened.

For that purpose the support 4 is bent three times: once counter clockwise at a right angle adjacent to the clamp 2; the second time clockwise at a right angle in the direction toward the post 20, establishing a portion 4a; and the third time clockwise, as a result of which a portion 4b is created that runs parallel to the initial portion 4c. The portion 4c is comparatively short, which allows on one hand affixing the flat screwhead 22 between the portions 4b, 4c and on the other hand still retaining a residual space which shall accommodate, although with a lesser volume, the injection-molding material of the frame 6.

The portion 4b grips the flat head 22 of the screw 21 passing through an orifice in the portion 4b, thereby making it is possible to tighten the screw.

What is claimed is:

1. A motor-vehicle body pivot-window in which a pane is pivotable about a substantially vertical pivot axis located at a leading edge of the pane, and can be locked in at least one pivoted position, the pivot-window comprising:

at least one clamp gripping the pane, said at least one clamp including two legs, one leg on each of two opposite sides of the pane;

a flexible bent segment fixed to one of said two legs, said flexible bent segment including a bent portion extending along said one of said two legs and a remaining portion bent with respect to said bent portion, said remaining portion being fixed to the motor-vehicle body, wherein said one of said two legs is on an exterior side of the pane with respect to the motor-vehicle body;

a frame encasing said clamp, said bent portion, and a peripheral edge of the panel; and orifices in each of said legs through which said frame extends to contact the pane;

wherein one of said orifices is aligned with an additional orifice provided in said bent portion, said frame extending through said one of said orifices and said additional orifice to contact said pane;

and wherein said bent portion extends along said one of said legs provided at said exterior side of said pane to thereby locate said pivot axis outward of said motor-vehicle body and to increase flexibility.

2. The motor-vehicle body pivot-window according to claim 1, wherein said frame is one of PVC and an elastomer material.

3. The motor-vehicle body pivot-window according to claim 1, wherein said frame is injection molded.

4. The motor-vehicle body pivot-window according to claim 1, further comprising:

adhesive between said legs and the pane retaining said at least one clamp on said opposite sides of the pane.

5. The motor-vehicle body pivot-window according to claim 1, wherein said bent portion is bent at substantially a right angle with respect to said remaining portion, an apex of said right angle defining the pivot axis.

6. The motor-vehicle body pivot-window according to claim 1, wherein said remaining portion extends from inside said frame to the motor-vehicle body.

* * * * *